May 24, 1966 J. H. WIGGINS 3,252,688
APPARATUS FOR RAISING A STIFF HORIZONTAL FRAME
Filed Nov. 10, 1964 7 Sheets-Sheet 1
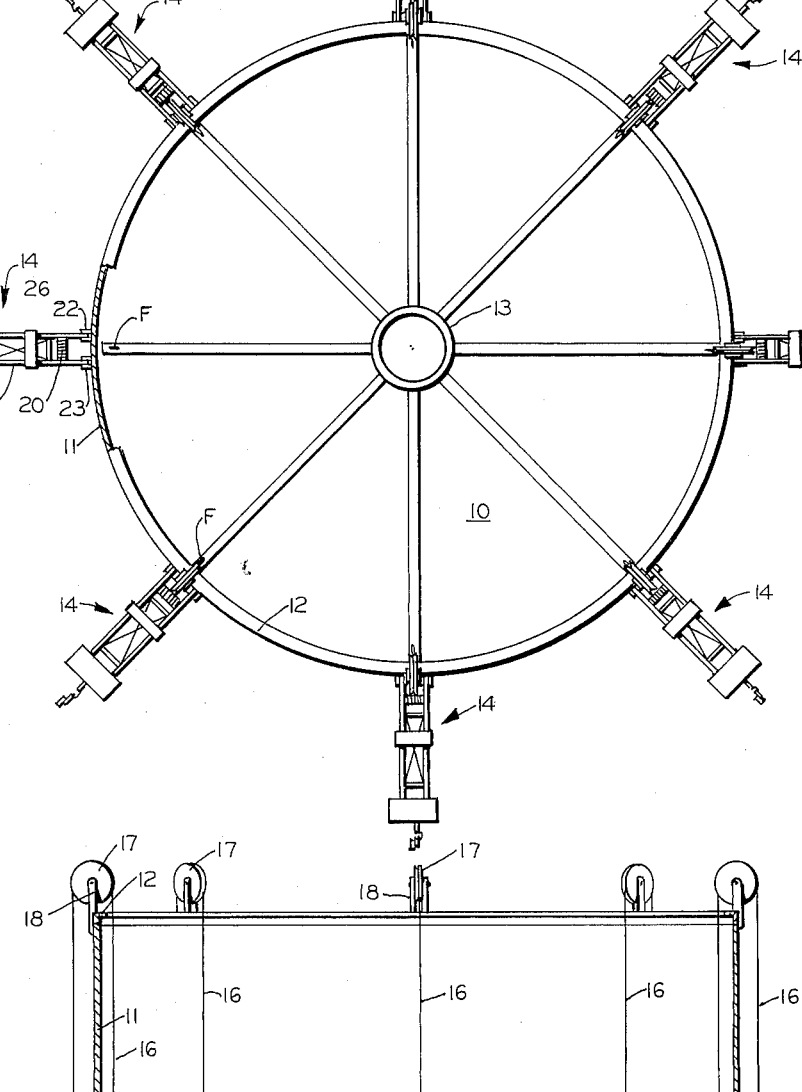
INVENTOR.
JOHN H. WIGGINS
BY
*Allen and Chromy*
ATTORNEYS May 24, 1966     J. H. WIGGINS     3,252,688
APPARATUS FOR RAISING A STIFF HORIZONTAL FRAME
Filed Nov. 10, 1964     7 Sheets-Sheet 2
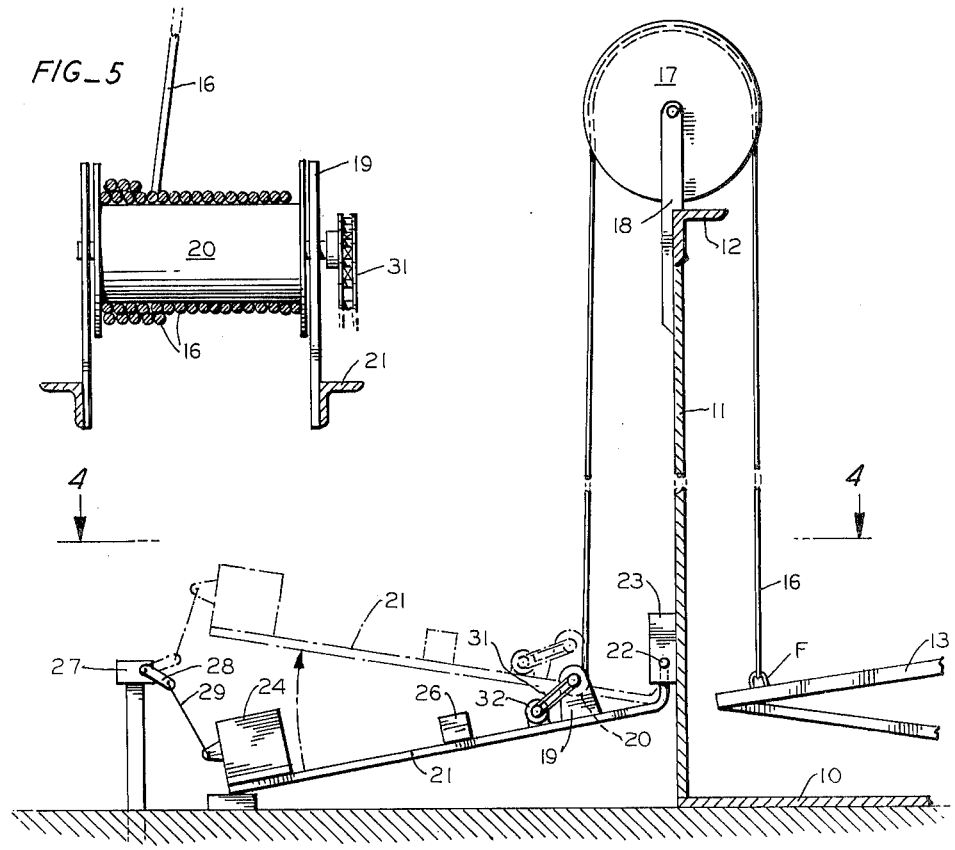
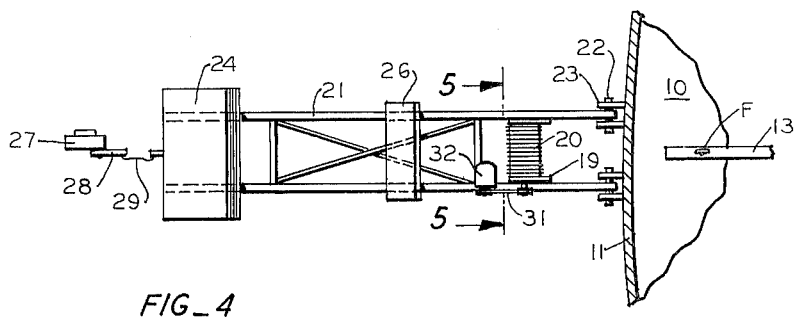
INVENTOR.
JOHN H. WIGGINS
BY
*Allen and Chromy*
ATTORNEYS May 24, 1966 J. H. WIGGINS 3,252,688
APPARATUS FOR RAISING A STIFF HORIZONTAL FRAME
Filed Nov. 10, 1964 7 Sheets-Sheet 3
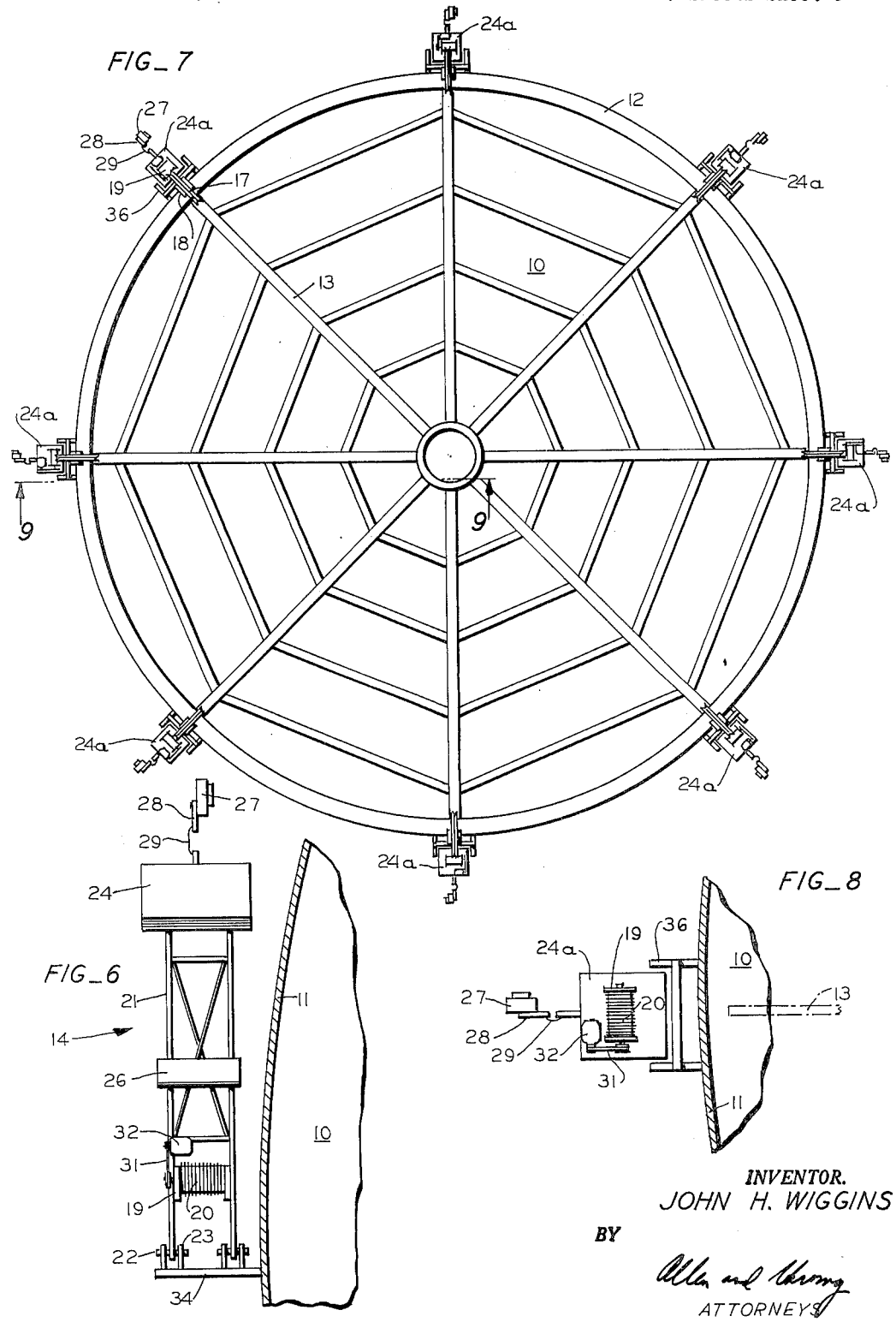
INVENTOR.
JOHN H. WIGGINS
BY
ATTORNEYS May 24, 1966  J. H. WIGGINS  3,252,688
APPARATUS FOR RAISING A STIFF HORIZONTAL FRAME
Filed Nov. 10, 1964  7 Sheets-Sheet 4
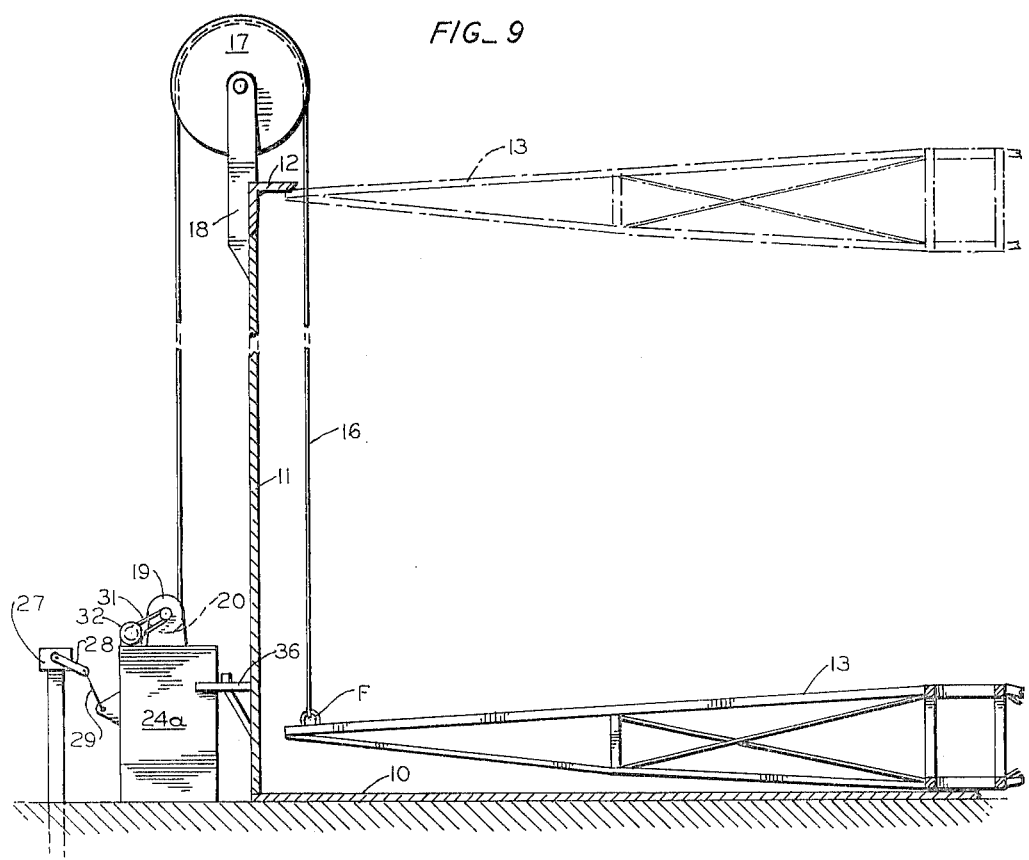
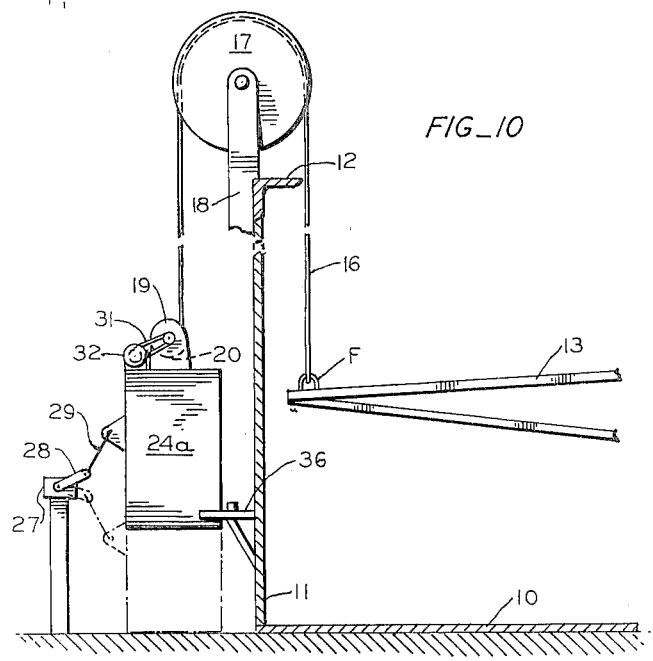
INVENTOR.
JOHN H. WIGGINS
BY
ATTORNEYS May 24, 1966  J. H. WIGGINS  3,252,688
APPARATUS FOR RAISING A STIFF HORIZONTAL FRAME
Filed Nov. 10, 1964  7 Sheets-Sheet 5
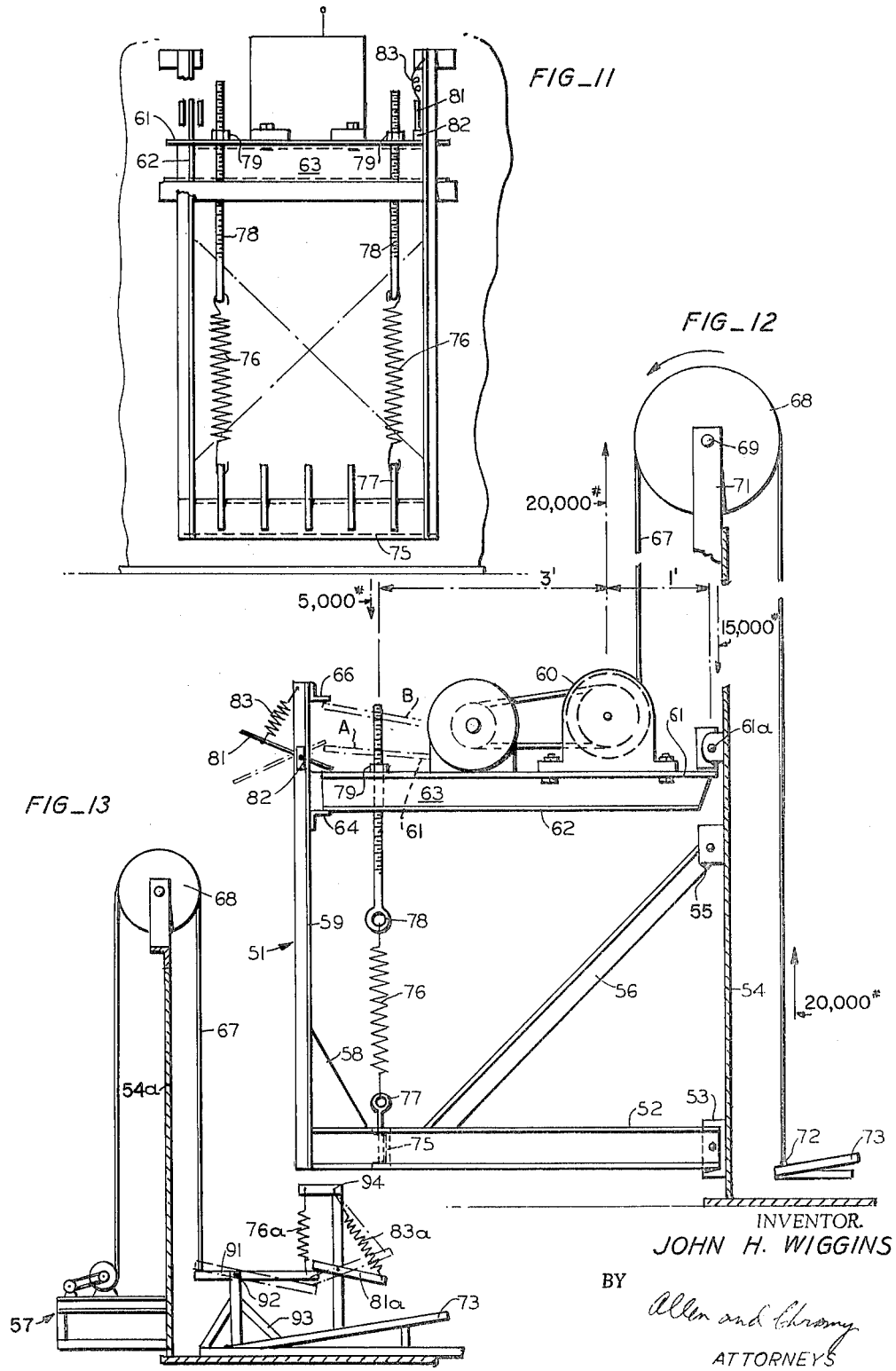
INVENTOR.
JOHN H. WIGGINS
BY
Allen and Chromy
ATTORNEYS May 24, 1966  J. H. WIGGINS  3,252,688
APPARATUS FOR RAISING A STIFF HORIZONTAL FRAME
Filed Nov. 10, 1964  7 Sheets-Sheet 6
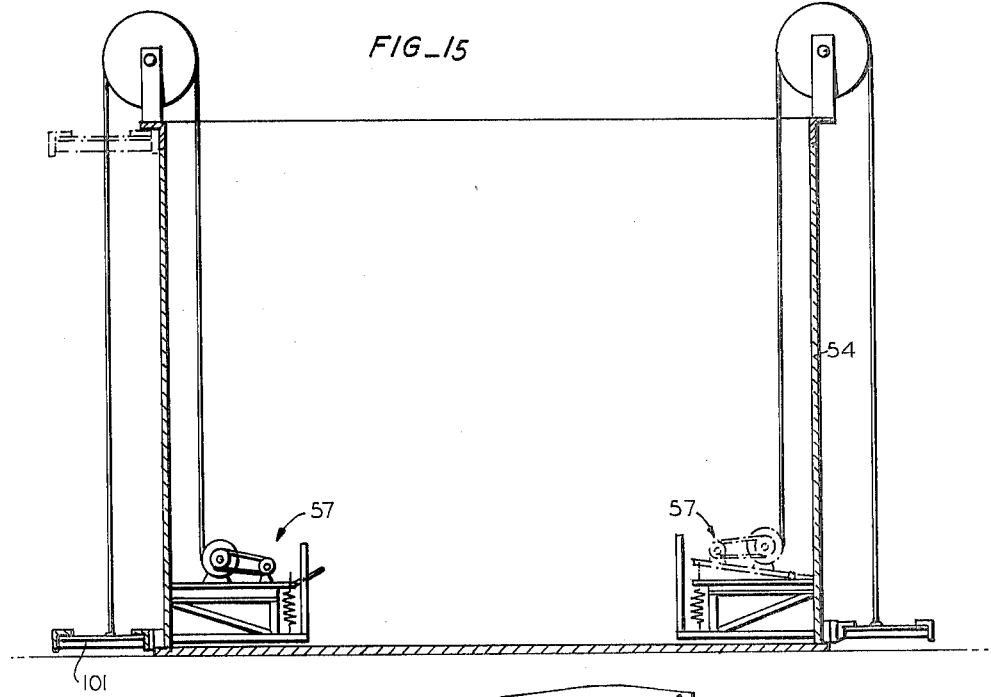
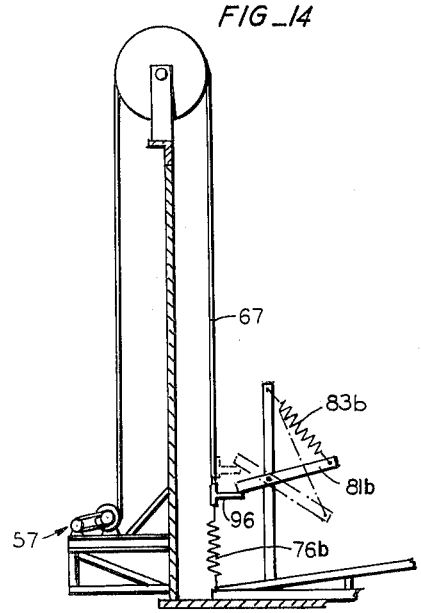
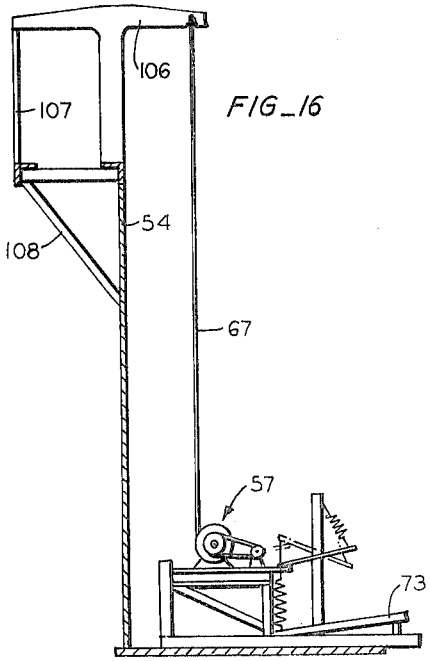
INVENTOR.
JOHN H. WIGGINS
BY *Allen and Chromy*
ATTORNEYS May 24, 1966 J. H. WIGGINS 3,252,688
APPARATUS FOR RAISING A STIFF HORIZONTAL FRAME
Filed Nov. 10, 1964 7 Sheets-Sheet 7
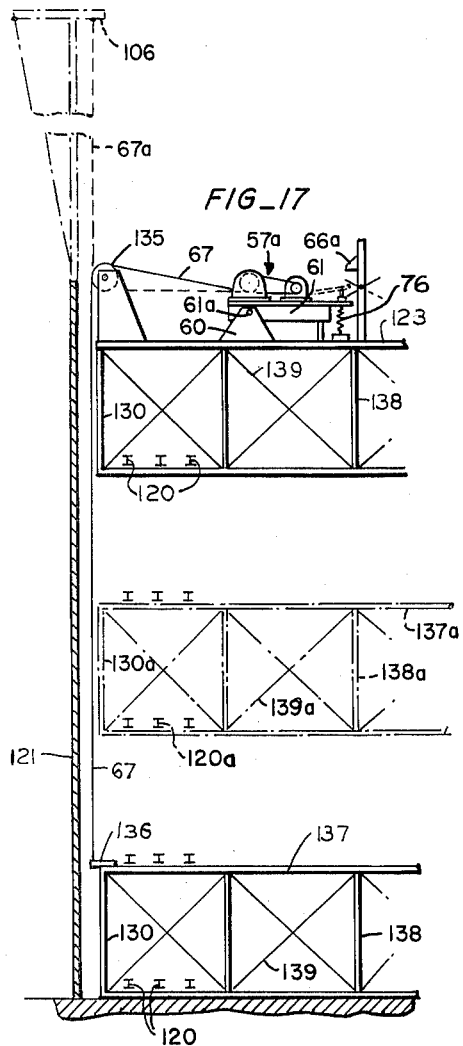
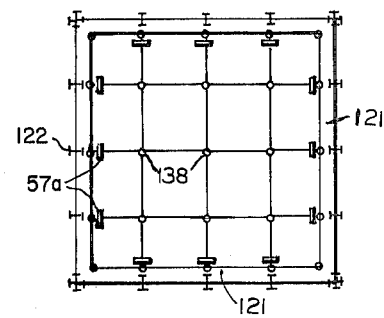
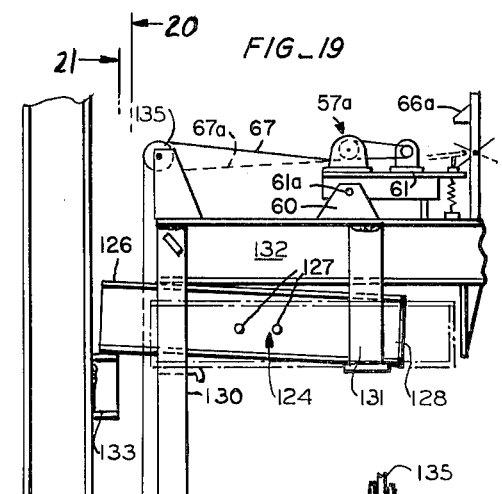
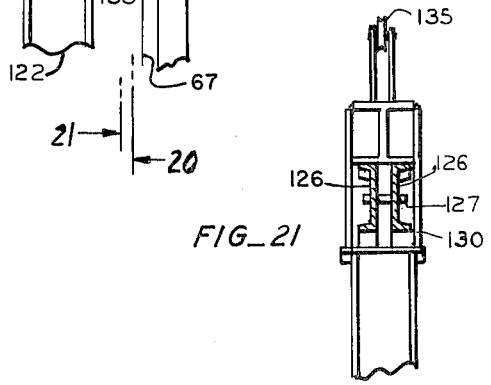
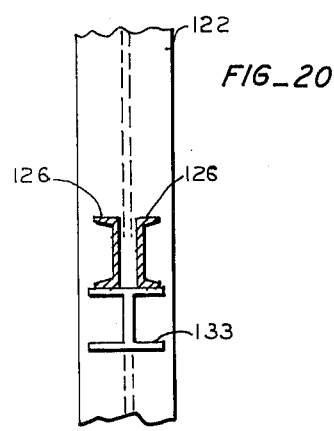
INVENTOR.
JOHN H. WIGGINS
BY
Allen and Chromy
ATTORNEYS

United States Patent Office

3,252,688
Patented May 24, 1966

3,252,688
APPARATUS FOR RAISING A STIFF
HORIZONTAL FRAME
John H. Wiggins, 801-C El Camino Real,
Menlo Park, Calif.
Filed Nov. 10, 1964, Ser. No. 411,675
10 Claims. (Cl. 254—89)

The present application is a continuation-in-part of my co-pending application Serial No. 182,171 filed March 26, 1962, now abandoned for Apparatus For Raising a Stiff Horizontal Roof Frame.

The present invention relates to apparatus for raising a stiff roof frame of the type placed on cylindrical tanks for storing liquids, gases, grains and the like, which generally have a cylindrical side wall and a roof secured to the top edge of the side wall. In the fabricating of such roofs or frames, it is readily seen that it is highly advantageous to assemble the frame of the roof at or near the ground and inside the wall, and completing all of its parts including the roof plates which may be welded in place while it is on the ground nad convenient to do so. Subsequently, the frame is raised as whole and fastened at its finished position at the top of the wall. The diameter of roofs of this character range to as wide as 250 feet, and are as high as 200 feet from the ground, so that by doing all the work on the ground, a considerable saving is effected and greater safety is insured. The weight of these large roof frames can exceed 500,000 pounds and, being rigid, it is desirable that they be raised in substantially level condition and to avoid undue lifting stress on any one of the plurality of cables and/or lifting units which are used to raise the frame.

Accordingly, it is a general object of the invention to provide apparatus which enables fabrication of a frame on the ground to completion, and subsequent lifting of the frame into position to be secured in place in a safe and efficient manner.

Another object of the invention is to provide a lifting apparatus comprising an array of lifting units in which the weight of each lifting unit is opposed to a portion of the weight of the roof so as to provide a system which is self-compensating in operation and which avoids undue stress on any individual cable or lifting unit.

A further object of the invention is to provide an array of lifting units for use in raising a frame in which each of the lifting units is connected by a cable to the roof and is individually responsive to insure continued movement or lifting of the roof irrespective of stopping of the individual lifting motor associated with the unit itself.

Still another object of the invention is to provide an array of lifting units for applying weights opposed to the weight of the roof and connected to the roof individually by winch and cable means so as to provide for automatic compensation or adjustment in the event of one lifting unit attempting to lead the adjacent units during the lifting of the roof.

Still another object of the invention is to provide a lifting apparatus in accordance with the foregoing objects in which the weight of each unit which opposes the roof is provided in the form of lever means so that the desired tension on each cable can be obtained with a comparatively small weight so as to make the lifting units less expensive, more portable and maneuverable.

The above and other objects of the invention are attained as described in the accompanying specification, taken in connection with the attached drawings, in which:

FIG. 1 is a schematic plan view of a tank, a frame and erecting units in conjunction therewith;

FIG. 2 is a sectional elevational view of the apparatus shown in FIG. 1, being taken in a plane indicated by the line 2—2 in FIG. 1.

FIG. 3 is an enlarged sectional elevational view of one of the lifting units in conjunction with a portion of the tank and the roof frame, the view being an enlargement of the left hand portion of FIG. 2;

FIG. 4 is a plan view of the lifting unit and parts as shown in FIG. 3;

FIG. 5 is a fragmentary sectional view taken as indicated by the line 5—5 in FIG. 4;

FIG. 6 is a view similar to FIG. 4, but showing a different orientation of the parts;

FIG. 7 through 10 illustrate a modified form of the invention;

FIG. 7 is a schematic plan view;

FIG. 8 is an enlarged schematic view of a portion of FIG. 7;

FIG. 9 is a sectional elevational view taken as indicated by the line 9—9 in FIG. 7, and shown in enlarged fashion;

FIG. 10 is an operational view similar to FIG. 9 but showing the roof in partially raised condition.

FIG. 11 is a front elevation view of a modified form of erecting unit, with certain parts broken away to show certain parts.

FIG. 12 is a side elevational view, partially in section, of the erecting unit shown in FIG. 11.

FIG. 13 is a schematic elevational view, partially in section, illustrating a modified form of the erecting unit where the erecting unit is placed outside of the wall with respect to which the frame structure is to be raised, and the control elements are mounted on the frame structure itself.

FIG. 14 is a view similar to FIG. 13 but showing a modified construction of the control mechanism which is carried by the frame structure to be raised.

FIG. 15 is an elevational view, partially in section, showing erection units placed inside of the wall with respect to which the structure is to be raised, and the structure to be raised placed exteriorly of the wall.

FIG. 16 is a view showing a temporary frame structure carried by the top of the wall with respect to which the rigid frame structure is to be raised, the entire erecting unit being mounted on the structure to be raised.

FIG. 17 is a schematic elevational view of a modified form of the invention wherein it is applied to the erection of the roof and floors of a building.

FIG. 18 is a schematic plan view of FIG. 17.

FIG. 19 is a fragmentary enlarged view of a portion of FIG. 17.

FIG. 20 is a sectional view taken as indicated by the line 20—20 in FIG. 19.

FIG. 21 is a sectional view taken as indicated by the line 21—21 in FIG. 19.

Referring to FIGS. 1 and 2, the lifting apparatus of the present invention is adapted for use, for example, with a tank including a bottom wall 10, a side wall 11 having a rim 12 projecting radially inwardly at the upper edge of the wall, and having a roof or frame 13 of rigid construction of a type adapted to be self-supporting when attached to the rim 12. The roofing plates with which the roof is finished may be applied while the roof frame 13 is on the ground but have been omitted from the drawings for reasons of simplicity.

The apparatus of the present invention includes a series of similar lifting units, three or more in number, and each unit 14 (FIGS. 1–3) includes a cable 16 which is attached at its inner end to the roof at F and extends over an upright sheave 17 carried by a frame 18 at the rim 12 of the wall 11, and the outer stretch of the cable 16 extends downwardly to a winch 19 having a drum 20 which is connected by a lever frame 21 pivoted at 22 to a bracket 23 on the sidewall of the tank. At the outer end of the lever means 21 there is provided a weight or load member 24 and intermediate the ends of this lever means there is provided a movable weight 26 which can be adjusted by hand along the lever means 21 so as to obtain fine adjustment to compensate for the total weight of any roof or frame being lifted. Associated with each lever means 21 is a switch 27 having a movable control arm 28 connected to the weight 24 by a flexible cable 29. The winch 19 is driven through a chain and sprocket drive connection 31 from a constant speed electric motor 32.

The wiring of the system places all of the switches 27 for the various units 14 in parallel with each other and in series with a main switch which is not shown, so that each unit can be conditioned for operation by closing the switch 27, and the entire system can be energized by closing the main switch.

In the embodiment shown, eight lifting units 14 are employed but they may be used in any number from three upwards, depending upon the size and total weight to be lifted. In lifting enormous loads of this character, it is desirable that the roof be maintained level during its entire lifting movement, and such control is preferably exercised within normal limits. It is to be pointed out, however, that with the present apparatus no harm is done if the frame goes any amount out of level within reasonable limits. No extra load is placed upon any cable by such an out of level condition. However, it is inherent in the operation of this apparatus that the frame will remain substantially level due to compensating action. To perform the lifting operation satisfactorily, it is desirable that each cable 16 have a tension such that the sum of the tensions of all the cables 16 will start to raise the frame 13 from a stationary condition. The lifting units are arranged symmetrically with respect to the roof so that each lift point will preferably require substantially the same cable tension as the others, and it is preferred that this tension must be equal to the dead weight of its fraction of the weight to be raised, plus the standing friction of its sheave 17, plus a margin of safety or certainty of from 1 to 2 percent of the dead weight of the lift point F. It is to be understood that this is the preferred form. An auxiliary lift may be applied at one or more points on the frame to overcome the stationary friction, and once started, the entire apparatus would continuously raise the frame, because the moving friction of the sheave is much less than the stationary friction. It is to be understood also that the auxiliary lift might be either an auxiliary winch or simply an additional starting weight at one or more of the lifting units. Further, it is contemplated that three directly connected winches might be employed with the frame in equal spaces around it to continually furnish a portion of the lift and the compensating action of this invention might be supplied by similar plurality or a multiple of units as described herein. With this proportioning of the weights and arrangement of the parts, i.e., the motor on the opposite side of the sheave 17 from its load, and because the friction of the sheave 17 is greatly reduced when in motion, it will be seen that once the roof is started to rise, the continuity to rise is assured because the weights 24 in toto are sufficient to lift the frame.

While all the motors presumably have the same speed, and this speed is constant, there will be some variation in the speed at which each individual cable winds onto its winch drum, and thus cause a variation in the lifting rate between two adjacent lifting units. To explain: the reeling of the cable 16 on its drum 20 will not be even in each case, especially due to the change in angle of a cable as it approaches a drum, so that one cable, for example, may reach its second layer ahead of an adjacent cable. In spite of the fact that the drums are turning at substantially the same speed, because of the variables inherent in a cable reeling on a drum, no two rates of lift can be guaranteed to be exactly the same. The principal variable is probably the difference in the manner in which the cables reel onto the different drums and how successive cable layers pile up on the drum and on each other. Therefore, there will be a difference in the rate of lift at various points. An attempted increase in rate of lift at a particular point F will result in an attempted extra lift applied to the two neighboring points F. Because of this attempted additional lift, the self-compensating and self-equalizing construction of the lifting units will result, not in an excessive increase of rate of rise of the roof 13 at that point, but instead, in simply the lifting of its counter-balancing weight 24. In some cases, the faster reeling of an individual winch will cause lifting of its weight 24 sufficient to operate through the flexible connection 29 to cut off the motor. The rate of rise is very slow, say about 20 ft. per hour. Thus if a weight is rising and the automatic cut off operates to stop the motor, the tension in the cable does not change when the weight changes from an upward to a downward direction, because the kinetic energy of motion is substantially at zero. The result is that at said cut-off, the tension in the cable does not change and the sheave does not stop moving and hence stationary friction is not reassumed at the sheave. The fact that the cable is quite long between winch and sheave and hence actually stretched like a spring helps maintain the above situation. It is pointed out that any unit during a lifting cycle could change from a "fast" lifter to a "slow" lifter and back again—with changes in the rate at which the cable winds on the winch drum. In this case there is no retrograde movement of the winch drum because of its one-way holding ratchet, and the weight 24 will continue to furnish the power for lift of this portion of the roof so that the lift is continued by lowering of the weight 24 until the motor is again switched on and takes up the load. This self-compensating and self-equalizing feature of the lifting units is important and insures the automatic continuous lifting operation.

This type of operation occurs with practically all of the lift units 14. The slowest lift unit will hardly pick its load off the ground. Most of the weights 24 will rise, but only a few of the faster ones may shut off their motors as described above.

When the frame has been raised practically to the full tank height, the highest point lifted will reach the stop rim 12 and the motor for that unit continues to run until it has lifted its load 24 to shut off the motor. Then that load 24 remains stationary holding the roof gently at that point against the stop rim 12. The other lifting points will soon hit their respective stop places in a like manner with a like result, and when all of the lifting points on the roof have engaged the stop rim 12, the motors are all shut off and the load or roof frame 13 hangs stationary. This roof frame 13 is gently pressing against the rim 12 around its periphery with that certainty of operation allowance which was installed in the weights 24. It will be noted that the lever means employed to apply the load in this modification provides for increased accuracy and control of the lifting movement for ease in the loading of the cable and increases the accuracy of control of the rise of the winch since the movement of the lever weight is several times the movement of the winch.

Referring to FIG. 6, a preferred construction is shown wherein the lever 21, instead of extending laterally with respect to a circular tank can be placed in a location closer to the tank so as to provide a more compact lifting system. The lever 21 in this case is pivotally mounted on a plate 34 secured to the tank wall so that the lever 21 is substantially in a tangential position with reference to the circular tank and, in any event, would be disposed at an angle of less than 90 degrees with respect to the tank wall.

Referring to FIGS. 7 through 10, a modified form of lifting unit is shown wherein the winch 19 and the associated motor 32 are mounted directly on a weight 24a which is guided in the U-shaped bracket 36 attached to the tank wall. Otherwise, the construction and operation of the parts are the same as those described in conjunction with FIGS. 1 through 5.

Referring to FIGS. 11 and 12, another preferred embodiment of an erecting or power unit is shown, the unit 57 including a frame 51 which includes a pair of spaced-apart base channels 52. Each channel 52 is secured at one end to a plate 53 attached to a shell or wall 54 and having a diagonal bracing angle 56 extending from each of the channels 52 to a lug 55 on the wall. Also a gusset plate 58 is provided at the outer end of each channel 52 to connect it to an upright angle 59 of the frame.

The motor and winch unit 60 (FIGS. 11 and 12) is mounted on a tilting plate 61 which is pivotally mounted at 61a on the shell or wall 54 of the structure and at its outer end rests on respective lugs 64 carried by the angles 59. The plate 61 is braced by respective side angles 62 welded at either side thereof and by a cross channel 63 extending between the angles 62. Spaced above each lug 64 is a second lug 66 which forms a safety or emergency stop for the tilting control plate 61, in the event a cable breaks. The cable 67 from the motor and winch unit 60 extends over an idler sheave 68 journalled at 69 in a temporary bracket 71 on the wall and the cable 67 extends down inside of the wall (or on the other side of the wall) and is attached at 72 to the stiff frame structure 73 to be lifted.

The hinged control plate 61 (FIGS. 11 and 12) is constantly urged downwardly by a plurality of springs 76, which are attached by eye-bolts 77 to a bottom cross-channel 75 of the frame and at their upper ends are attached to respective adjustable eye-bolts 78 each extending through the plate 61 and having a stop-nut 79 threaded thereon. As seen in FIG. 11 a series of the springs 76 are employed and the stop-nuts 79 may be adjusted so that the tension of the springs can be varied and thereby the force urging the plate 61 downwardly to place a desired tension or force on the cable 67. The tension on the cable 67 can also be varied by varying the number of springs 76. It will be understood that the tension placed on the cable by the springs 76 of a unit 57 is sufficient to lift its share of the load.

An "on" and "off" control lever (FIGS. 11 and 12) is pivotally mounted on a switchbox 82 for the motor on one of the upright angles 59 and is urged to its upper or "on" position by a tension spring 83. The control bar or lever 81 is shown in its upper or "on" position in full lines and appears as seen in FIG. 12. The inner end of control lever 81 rests on the control plate 61 at all times. As the plate 61 is lifted or tilted as shown in dotted lines, the lever 81 will be rotated counter-clockwise to its dotted line "off" position A. The switch box 82 has a switch therein which is operated by the lever 81 in a conventional manner in order to control the operation of the motor of the drive unit 60.

The operation of the unit shown in FIGS. 11 and 12 with a plurality of these units around the periphery of the stiff frame structure 73 is as follows. The minimum and maximum desired tensions for each group of springs 76 are say 5,000 lbs. and 6,000 lbs, respectively. When the main starting switch to all the motors is turned on each group of springs, each group of springs 76 is stretched 5 inches and is pulling 5,000 lbs. on plate 61 at 79. Each motor runs until each group of springs 76 is stretched an additional one inch, until it is pulling 6,000 lbs. at which point the automatic switch goes off. As the frame continues to rise each group of springs 76 shortens to 5 inches where it is pulling 5,000 lbs. and the automatic switch goes on. This completes a full cycle of the "on" and "off" operation of the switch. In the full line position of the lift unit in FIG. 12, for example, with the stop-nut 79 in the position shown there is a 5,000 lb. downward pull against the plate 61. Assuming as an example the dimensions given in FIG. 12, i.e., from the point of application of the force spring 76 to the center of the winch 60 is 3 ft., and from the center of the winch 60 to the pivotal axis 71a is 1 ft., a 20,000 lb. lift for the unit would involve a 5,000 lb. pull against the springs 76 and a 15,000 lb. pull against the pivot 61a. In other words, the springs 76 pulls down on the plate 61 through the nuts 79, and the pivot 61a in the example given pulls down on the plate 3 times as much as the springs. The cable 67 pulls up on the plate through the winch and amount which is the sum of the pull-down forces at 79 and 61a. When the pivoted control plate 61 lifts to position A, this additional movement moves the switch control lever 81 to cause the switch to go "off." The position B shown for the lifting plate 61 is an emergency stop position and would not be used in the normal operation. It will be seen that the effect of the series of lifting units adjacent or around a rigid structure to be lifted is substantially the same in operation as found in an hydraulic apparatus, as the lifting effect of each unit is automatically controlled to be substantially the same, and substantially uniform at all the points of lift.

Referring to FIG. 13, a power or erecting unit 57 as described in connection with FIGS. 11 and 12 is stationarily mounted on the outside of a wall 54a, and the cable 67 extends over a sheave 68 and is attached to the end of a lever 91 pivoted at 92 on a control frame 93 disposed inside of the wall on the frame structure 73 to be lifted. The springs 76a are secured between the ends of a lever 91 and a fixed bracket 94. The control spring 83a for the control lever 81a is also provided so that the switch box 82a will be operating in accordance with the changes in tension in the cable 67.

Referring to FIG. 14 there is illustrated a modified form wherein the cable 67 is connected to a control member 96 which in turn is connected to the spring 76b, the switch control lever 81b and its spring 83b being connected as shown in FIG. 13.

Referring to FIG. 15 there is illustrated a structure wherein a series of the units 57 are placed inside of the wall 54 when it is desired to raise a rigid frame structure on the outside of the wall, the structure illustrated in this case being a frame or windgirder 101.

Referring to FIG. 16 there is illustrated a construction where the lifting unit 57 is mounted on the rigid frame structure 73 so as to be lifted therewith and the cable 67 extends directly upwardly from the winch to a T-frame 106 which is mounted on the wall 54 by means including a rod 107 and its supporting framework 108.

Referring to FIGS. 17 through 21 there is illustrated a further modification as mentioned wherein the lifting or erecting unit is employed in association with construction of a building. The form of the invention illustrated in FIG. 16 is employed in this story frame erection method.

Referring first to FIG. 17 and 18 there is shown a building structure including a wall frame 121 at each of the four sides of the building, this wall frame being of the skeleton steel construction and being erected to the full height of the building. At the top of the wall frame a series of the T-brackets 106 are mounted and each of these connected by its cable 67 to an associated erection unit 57a illustrated schematically and 3 of these units are provided along each wall. Each unit 57a (FIG. 17) includes a plate 61 and is pivotally mounted at 61a on a pair of brackets 60. The cable 67 extends horizontally to a sheave 135 and is shown in full lines extending down to a plate 136 and in dotted lines extending up to the T-frame 106. The springs 76 resist tilting of the unit 57a about its pivotal mounting 61a under the pull of the cable.

The roof and top story frame is first constructed at ground level. The roof and top story frame is made up of I-beam structure at the top and the bottom which are connected by vertical posts 138, and the lower I-beam structure has a plurality of rafters 120 extending thereacross so that a rigid construction is provided by the rafters, the top and bottom I-beam frames, the vertical posts 138, and the diagonal bracing 139. In raising a first or roof and top story frame 123, the operation is exactly as shown in FIG. 16, the erecting units 57a being mounted on the roof and top story frame 123 and the cables 67 extending upwardly to the T-brackets 106 as indicated in dotted lines. When this roof and top story frame is raised to the desired height, it is temporarily supported by wall posts 122 by means of a connection element in the form of a sliding bar or key 124 at each fastening station on a wall post 122. Each bar 124 (FIGS. 19–21) comprises a pair of channels 126 (FIG. 21) secured in spaced-apart relation by respective connecting bars 127 and by an end-plate 128. The bar 124 is carried by U-shaped brackets 130 and 131 from an I-beam 132 of the roof frame 123 and being slidable outwardly to rest on an I-beam lug 133 on the adjacent post 122 of the wall 121. As seen in FIG. 20 the end of the two channels 126 of the bar 124 are spaced-apart to provide space for the cable 67 when it is later used in erecting a story frame as will be described. During the raising of the roof and story frame the connecting bars 124 are disposed in their retracted position shown in dotted lines in FIG. 19.

With the roof and top story frame 123 in position as shown in FIG. 17, the cable 67 from each of the winches or erecting units 57 is carried from the unit 57a over an idler sheave 135 supported on the top story frame 123 and thence downwardly and connected to a lifting plate 136 on the next story frame 137 to be raised. This story frame is then raised to a position spaced from the top roof and story frame by the height of one floor as indicated in dotted lines at 137a and it is temporarily anchored in this position by the same type of key or supporting bars 124 as previously described.

When a desired series of story frames have been raised and secured in place, the intermediate posts 138b and ties 139b are installed resulting in a series of posts 138 in vertically aligned relation extending from the roof entirely down to the foundation so that there is adequate support for the structure.

After the complete steel framing for the various stories is in place, the rest of the construction can be completed by erecting a conventional elevator structure and pouring the concrete in the desired locations.

While I have shown and described certain preferred forms of the invention, it is apparent that the invention is capable of variation and modification from the forms shown so that the scope thereof would be limited only to the proper scope of the claims appended hereto.

What I claim is:

1. An apparatus for raising a stiff horizontal member positioned adjacent a structure having upright wall means, said apparatus comprising a series of units spaced along the border of said horizontal member, each of said units comprising a load member, a support for said load member, a power driven winch mounted for movement with said load member, a cable extending from said winch and attached to said stiff horizontal member, said winch lifting said load member under certain tension conditions of said cable, each of said cables having a tension placed upon it by the associated load member of each cable, said tension being a predetermined amount when said load member is lifted off said support, thereby applying a lifting force to said stiff horizontal member.

2. An apparatus for raising a stiff horizontal member adjacent a structure having upright wall means, said apparatus comprising a series of units spaced along the border of said horizontal member, each of said units comprising a load member, a power driven winch, said winch lifting said load member under certain conditions, a cable extending from each of said winches and connected to said stiff horizontal member, each of said cables having an original tension placed upon it by the associated load member, the sum of the tensions of all said cables created by said load members being sufficient to start to raise the horizontal member, and means for interrupting the operation of said winch in response to a given increase of tension in a cable from the combined effects of said load member and said winch, the continued lift of said stiff horizontal member from the effect of said load member alone continuing until the cable tension has decreased to said original tension.

3. An apparatus for raising a stiff horizontal member with respect to a structure having a wall means, as recited in claim 2, including lever means for increasing the effect of each said load member to obtain said original tension.

4. An apparatus for raising a stiff horizontal member with respect to a structure having a wall means as recited in claim 2, in which a lever support is provided for said load member, said lever being pivotally mounted and carrying said load member at its movable end and said winch being carried intermediate its end.

5. An apparatus for raising a stiff horizontal member with respect to a structure having a wall means as recited in claim 2, in which a lever support is provided for said load member, said lever being pivotally mounted and carrying said load member at its movable end, said winch being carried adjacent its pivoted end, and a movable auxiliary weight is provided on said lever support.

6. An apparatus for raising a stiff horizontal member with respect to a structure having a wall means as recited in claim 4, in which said lever is disposed at an angle of less than 90 degrees with respect to said wall means.

7. An apparatus for raising a stiff horizontal member with respect to a structure having a wall means as recited in claim 4, in which said wall means is circular in outline and said lever is disposed substantially tangentially with respect to said wall means.

8. An apparatus for raising a stiff horizontal member with respect to a structure having an upright wall means, said apparatus comprising a series of units spaced along the border of said horizontal member and said wall means, each of said units comprising a load member, a support for each said load member, power driven means mounted for movement with each of said load members, connecting means extending from said power driven means and connected to said horizontal member, each of said connecting means having a force applied thereto by the associated load member, means responsive to raising of said load member beyond a certain predetermined point to interrupt the operation of the associated power driven means, and means responsive to lowering of the load member to a predetermined low point for starting operation of said power driven means.

9. An apparatus for raising a stiff horizontal member with respect to a structure having upright wall means, said apparatus comprising a series of units spaced along the border of said horizontal member and said wall means, each of said units comprising a load member, a support for said load member, a power-driven winch mounted for movement with said load member, said winch lifting said load member under certain conditions, a sheave mounted adjacent the top edge of said wall means, a cable actuated by said winch and extending upwardly therefrom and passing over said sheave and being attached to said horizontal member, each of said cables having a tension placed upon it by the associated load member of each cable, said tension being a predetermined amount when said load member is lifted off said support, thereby controlling the lifting force applied to said horizontal member.

10. An apparatus for raising a stiff horizontal member adjacent a structure having upright wall means, said apparatus comprising a series of units spaced along the border of said horizontal member, each of said units comprising a load member, a power driven winch mounted for movement with said load member, said winch lifting said load member under certain conditions, a cable extending from each of said winches and connected to said stiff horizontal member, each of said cables having an original tension placed upon it by the associated load member, the sum of the tensions of all said cables created by said load members being sufficient to start to raise the horizontal member, and means for interrupting the operation of said winch in response to a given increase of tension in a cable from the combined effects of said load member and said winch, the continued lift of said stiff horizontal member from the effect of said load member alone continuing until the cable tension has decreased to said original tension.

References Cited by the Examiner
UNITED STATES PATENTS

| | | | |
|---|---|---|---|
| 2,617,168 | 11/1952 | Johnson | 254—89 |
| 2,732,177 | 1/1956 | Ludowici | 254—89 |
| 2,749,592 | 6/1956 | Vartia | 50—534 |
| 2,826,157 | 3/1958 | Vartia | 50—534 |
| 2,919,896 | 1/1960 | Wurst | 254—105 |
| 3,085,785 | 4/1963 | Peterson | 254—89 |

WILLIAM FELDMAN, *Primary Examiner.*

MILTON S. MEHR, *Examiner.*